United States Patent Office 3,839,457
Patented Oct. 1, 1974

3,839,457
PROCESS FOR THE PREPARATION OF 2-HEXENAL
Michel Jouffret, Francheville-le-Bas, France, assignor to Rhone-Poulenc S.A., Paris, France
No Drawing. Filed July 27, 1971, Ser. No. 166,636
Claims priority, application France, July 28, 1970, 7027793
Int. Cl. C07c 47/20
U.S. Cl. 260—601 R    7 Claims

ABSTRACT OF THE DISCLOSURE

Trans-2-hexenal is obtained by treating cyclohexyl hydroperoxide in the liquid phase with an aqueous solution of a palladium derivative e.g. $PdCl_2 \cdot 2H_2O$. An aqueous suspension of hydroperoxide, optionally with a water immiscible organic solvent such as cyclohexane, may be heated at 50–180° C. with the palladium derivative.

---

The present invention relates to a new process for producing trans-2-hexenal. 2-Hexenal, has been prepared previously by oxidation of 2-hexen-1-ol with chromic acid [Delaby and Guillot-Allegre-C.R. Acad. Sc. 1468 (1931)] and by dehydration of 2-hexene-1,4-diol [Prevost-Bull. Soc. Chim. Fr. *11* 224 (1944)].

The present invention provides a particularly simple process for preparing trans-2-hexenal which is very suitable for exploitation on an industrial scale.

The present invention provides a process for the preparation of trans-2-hexenal, wherein cyclohexyl hydroperoxide is treated in the liquid phase with an aqueous solution of a palladium derivative. The term "palladium derivative" is applied to the product which is made into a solution.

Cyclohexyl hydroperoxide can be obtained from cyclohexanol or by oxidation of cyclohexane in the liquid phase, without a catalyst, by means of a gas containing molecular oxygen, optionally in the presence of agents capable of complexing metal ions, for example, as described in French Patent Specification Nos. 1,404,723, and 1,491,518. The hydroperoxide can be purified by known method such as conversion to the sodium salt and treatment of the sodium salt with carbon dioxide.

The hydroperoxide can be used in the form of a suspension in water. For technological and economic reasons, it is advantageous to use amounts of water such that the proportion by weight of hydroperoxide in the suspension is between 2% and 50%, and preferably between 5 and 30%.

The process can also be carried out in the presence of an organic solvent for the hydroperoxide, preferably a solvent which is immiscible with water. This solvent can, for example, be a linear ether, an ester such as a lower alkyl alkylcarboxylate or arylcarboxylate, or a hydrocarbon. Because of their easy availability, it is preferred to use as solvent alkanes or alkenes having from 6 to 20 carbon atoms, cycloalkanes or cycloalkenes having from 5 to 16 carbon atoms in the ring and optionally substituted by alkyl radicals having from 1 to 4 carbon atoms, or benzene or monosubstituted or polysubstituted benzenes where the substituent(s) is chlorine or fluorine, alkyl of 1 to 4 carbon atoms, alkoxy of 1 to 4 carbon atoms, nitro or nitrile, a phenyl radical which itself may be substituted by alkyl or alkoxy of 1 to 4 carbon atoms or by nitro or nitrile. It is also possible to use aromatic hydrocarbons with partially condensed or wholly hydrogenated rings, such as tetralin or decalin. For the reasons given above, it is advantageous to use amounts of water and of organic solvent such that the proportion by weight of hydroperoxide in the mixture used for the reaction is between the values given above. If an organic solvent, such as defined above, is used, the weight of water should be at least of the order of 1% relative to the weight of the organic solution, which can be saturated with water if appropriate; the preferred weights, expressed in the same way, are between 5% and 20%.

As palladium catalyst the chlorine, optionally in the hydrated form, can be used with advantage. The amounts of catalyst are generally chosen in such a way that they introduce from 1 to 20 gram atoms of elemental metal per 100 mols of hydroperoxide involved. The preferred amounts, again relative to 100 mols of hydroperoxide, are between 5 and 15 gram atoms of elemental palladium.

The process of the invention may be put into practice by mixing the hydroperoxide, the water and, where relevant, the organic solvent, at ordinary temperature, and then adding the catalyst; thereafter the mixture is heated to the chosen temperature, which is generally between 50 and 180° C. and preferably between 70 and 150° C. In an alternative procedure, the hydroperoxide, optionally in solution, can be introduced into the mixture of the other constituents previously heated to the chosen temperature. If the temperature employed is above the boiling point of the mixture, the reaction can be carried out in an apparatus which is under pressure. The mixture can be kept in the liquid phase, if appropriate, by introducing an inert gas such as nitrogen or argon. At the end of the reaction, the duration of which is of the order of several hours, the trans-2-hexenal formed can be isolated from the residual mixture by applying the usual methods, for example by fractional distillation.

The pharmacological, fungicidal, anti-microbial and bronzing properties of trans-2-hexenal make it of great interest in cosmetics. This aldehyde is one of the principles responsible for the greenness in nature; its use is widespread in the field of aroma substances (Bedoukian—Perfumery and Flavoring Synthetics—Elsevier Publishing Company—1967).

The following Examples are given to illustrate the invention.

EXAMPLE 1

60 g. of a cyclohexane solution containing 10% by weight of cyclohexyl hydroperoxide are introduced into a 250 cm.$^3$ autoclave. Thereafter 4.5 g. of water are added, followed by 1.5 g. of an aqueous solution of palladium chloride dihydrate containing 35% by weight of elemental palladium. The autoclave is closed and then heated to 125° C. for 3 hours, while the contents are stirred. After cooling and release of the gas, the residual mixture is decanted and the aqueous phase is extracted with ether. The combined organic phases are distilled, and the ether and cyclohexane removed.

Vapour phase chromatography shows that the residue contains 2.3 g. of 2-hexenal as well as 0.345 g. of cyclohexanol and 0.35 g. of cyclohexanone. N.M.R. examination of a sample shows that the 2-hexenal is of trans structure.

EXAMPLE 2

A mixture of 585 g. of cyclohexane, 30.4 g. of $$PdCl_2 \cdot 2NaCl$$

and 90 g. of water is boiled (77° C.) and a solution prepared from 273 g. of cyclohexane and 125 g. of cyclohexyl hydroperoxide is then gradually introduced over the course of 1 hour 40 minutes. The mixture is thereafter boiled for 2 hours 40 minutes.

After cooling, the mixture is filtered and decanted, and the organic layer is twice washed, using 60 g. of water each time. The organic phase is gradually distilled under reduced pressure, the cyclohexane is removed first and a fraction then collected which contains 53 g. of trans-2-hexenal, 16 g. of cyclohexanone and 8.8 g. of cyclohexanol.

The trans-2-hexenal is thereafter isolated from the mixture by fractional distillation under 100 mm. of mercury, using a rotating strip column.

I claim:

1. A process for the preparation of trans-2-hexenal, which consists essentially of treating
at 50–180° C.
a water suspension of cyclohexyl hydroperoxide with an aqueous solution of palladium chloride.

2. A process according to claim 1 wherein said water suspension comprises 2–50% by weight of cyclohexyl hydroperoxide.

3. A process according to claim 1 wherein the palladium chloride is palladium chloride dihydrate.

4. A process according to claim 1 wherein the treatment is carried out in the presence of an amount of palladium chloride containing 1–20 gram atoms palladium per 100 moles of hydroperoxide.

5. A process for the preparation of trans-2-hexenal which consists essentially of
treating an organic solvent solution of cyclohexyl hydroperoxide
at 50 to 180° C.
with an aqueous solution of palladium chloride,
the organic solvent for the hydroperoxide being immiscible with water so that two liquid phases are formed; said solvent being selected from the group consisting of alkanes and alkenes having from 6 to 20 carbon atoms, cycloalkanes and cycloalkenes having from 5 to 16 carbon atoms in the ring and optionally substituted by alkyl radicals having from 1 to 4 carbon atoms, benzene, mono-substituted and poly-substituted benzenes where the substituent(s) is chlorine or fluorine, alkyl of 1 to 4 carbon atoms, alkoxy of 1 to 4 carbon atoms, nitro or nitrile, a phenyl radical which itself may be substituted by alkyl or alkoxy of 1 to 4 carbon atoms or by nitro or nitrile; tetralin and decalin and
recovering trans-2-hexenal from the organic phase.

6. A process according to claim 5 wherein the organic solvent is cyclohexane.

7. A process according to claim 5 wherein the treatment is carried out in the presence of a mixture of the organic solvent and water containing 5–20% by weight of water relative to the organic solution.

References Cited

UNITED STATES PATENTS 2,733,270   1/1956   Fisher _____ 252—472 X

FOREIGN PATENTS 290,978    6/1965   Netherlands _____ 260—610
393,312   10/1965   Switzerland _____ 260—610

BERNARD HELFIN, Primary Examiner

D. B. SPRINGER, Assistant Examiner